United States Patent [19]

Wynne, Jr.

[11] Patent Number: 4,933,660
[45] Date of Patent: Jun. 12, 1990

[54] TOUCH SENSOR WITH TOUCH PRESSURE CAPABILITY

[75] Inventor: James R. Wynne, Jr., Roane County, Tenn.

[73] Assignee: Elographics, Inc., Oak Ridge, Tenn.

[21] Appl. No.: 427,785

[22] Filed: Oct. 27, 1989

[51] Int. Cl.$^5$ ............................................. H01C 10/10
[52] U.S. Cl. ...................................... 338/114; 338/99
[58] Field of Search ..................... 338/114, 99; 178/18; 200/5 A

[56] References Cited

U.S. PATENT DOCUMENTS

| | | | |
|---|---|---|---|
| 3,798,370 | 3/1974 | Hurst | 178/18 |
| 4,198,539 | 4/1980 | Pepper, Jr. | 178/18 |
| 4,314,227 | 2/1982 | Eventoff | 338/99 |
| 4,315,238 | 2/1982 | Eventoff | 338/99 |
| 4,529,959 | 7/1985 | Ito et al. | 338/99 X |
| 4,570,149 | 2/1986 | Thornburg et al. | 338/99 X |
| 4,687,885 | 8/1987 | Talmage et al. | 178/18 |

Primary Examiner—Bruce A. Reynolds
Assistant Examiner—M. M. Lateef
Attorney, Agent, or Firm—Pitts and Brittian

[57] ABSTRACT

A touch sensor device, and its method of operation, that provides information as to the position of a touch thereon together with information as to the amount of pressure applied to the sensor at the touch position. The device has a pair of spaced-apart membranous sheets with coatings thereon suitable for the determination of position information in a conventional manner. In addition, switching units are included which, during a given time interval of operation, supply a uniform electrical potential in one of the sheets. During that same interval contacts or electrodes on opposite edges of the second sheet are rapidly switched to alternately be oppositely connected to ground on one edge and to the information processing unit at the other edge. In this manner, there is a fixed potential applied to the contact resistance circuit created between the sheets due to the touch pressure, and the alternate switching averages the potential on the second sheet. As a result, the pressure information is substantially independent of the position of touch on the sensor.

15 Claims, 3 Drawing Sheets

TOUCH SENSOR WITH TOUCH PRESSURE CAPABILITY

DESCRIPTION

1. Technical Field

This invention relates to a touch-sensitive device for placement over a CRT screen or other information display unit, and more particularly to a device possessing the capability of measuring the amount of pressure applied to the device by a touch while also yielding the X- and Y-coordinates of the location of the touch.

2. Background Art

There are many fields of technology where it is desirable to generate electrical signals that are proportional to some physical point in a multidimensional coordinate system. For example, it is often desirable to accurately reconstruct graphs or other technical data representation for the purpose of storing such data in computers, or to process such data in a particular manner. A device which has come into use for this purpose is known as a touch sensor wherein orthogonal electrical fields are produced, one in an X direction and one in a Y direction, in a coordinate system. Contact (touch) of the sensor at a specific location with a finger, stylus or other object causes the generation of a signal that is representative of the coordinates of that particular point.

There are other applications for touch sensors where information other than just coordinates of a point are to be selected or determined. For example, it is frequently desired to take some action by equipment based upon a selected pressure/force applied to the sensor. Typically this can be utilized to move a cursor to a specific position on a display screen and/or cause execution of a function as a result of the applied pressure/force.

Certain prior art devices have provided for the generation of a signal related to pressure/force. Such a prior art device is found in U.S. Pat. No. 3,798,370 issued to G. S. Hurst on Mar. 19, 1974. This patent has a common assignee to the present invention. Another sensor having built-in capability to determine pressure is described in U.S. Pat. No. 4,198,539 issued to W. Pepper, Jr., on Apr. 15, 1980. There are certain switch units that depend upon applied pressure, such as those described in U.S. Pat. Nos. 4,314,227 and 4,315,238.

Another sensor system that provides a signal related to pressure at the contacted point is that described in U.S. Pat. No. 4,687,885 issued to J. E. Talmage, et al., on Aug. 18, 1987. This patent also has a common assignee to the present invention. According to that '885 patent, a material of relatively high resistivity is inserted between the resistive coating on one layer and the conductive contact layer. The purpose of this material is to generally create a linear relationship of contact resistance versus the contact pressure. The use of this high resistance material requires the fabrication of a special sensor for those uses where a pressure-related signal was desired. Further, that construction is considerably more expensive to construct than those sensors utilized for just X- and Y-coordinate information. The device of the '885 patent, although providing a pressure-related signal, generates that signal with variations as to the point of the touch.

Accordingly, it is an object of the present invention to provide a touch sensor of simple design that also provides for the production of a signal related to pressure of the touch.

It is another object of the present invention to provide for the utilization of a touch sensor constructed for the production of X- and Y-coordinate signals for the purpose of also obtaining a signal related to the pressure applied during the touch of the touch sensor.

It is also an object of the present invention to provide means for the appropriate switching of connections to a touch sensor whereby X- and Y-coordinate signals are obtained together with signals related to the applied pressure.

It is a further object of the present invention to provide a touch sensor that, while providing signals related to X- and Y-coordinates of a touched point, also provides a signal accurately related to the applied pressure at any position on the touch sensor.

These and other objects of the present invention will become apparent upon a consideration of the accompanying drawings and the detailed description thereof that follows.

DISCLOSURE OF THE INVENTION

A device constructed in accordance with various characteristics of the present invention provides for the measurement of the force or pressure applied to the device by the touch of some object, while also yielding the X- and Y-coordinates of the touched point. In the preferred embodiments of the invention, there are two sheets, each coated on facing surfaces with materials appropriate for producing signals corresponding to X- and Y-coordinates of a touched point. These sheets are prevented from accidental contact through the use of spaced-apart separator dots or the like. In one embodiment, both of the sheets are provided with edge electrodes in a configuration such that an electrical field can be produced in one sheet that is orthogonal to an electrical field produced in the second sheet. In another embodiment, the orthogonal fields are produced in a single sheet, with the second sheet being used for obtaining the touch position and pressure information when brought into contact with the first sheet. Electrical potentials are applied to these electrodes in appropriate time sequences to produce these fields and obtain the coordinate signals. In either of these embodiments, pressure applied to any point on the sensor produces a resistive electrical contact with an attendant voltage gradient between the sheets. Without correction, however, this resistive contact voltage gradient is sensitive to the position of touch. However, if during one time period, the contacts to the sheet being used for signal information are alternately switched from edge to edge, the non-linearity due to position is substantially eliminated. It is during this interval of switching that the resistance at the contact point is monitored to obtain the pressure information.

BEST MODE FOR CARRYING OUT THE INVENTION

Figure 1A:
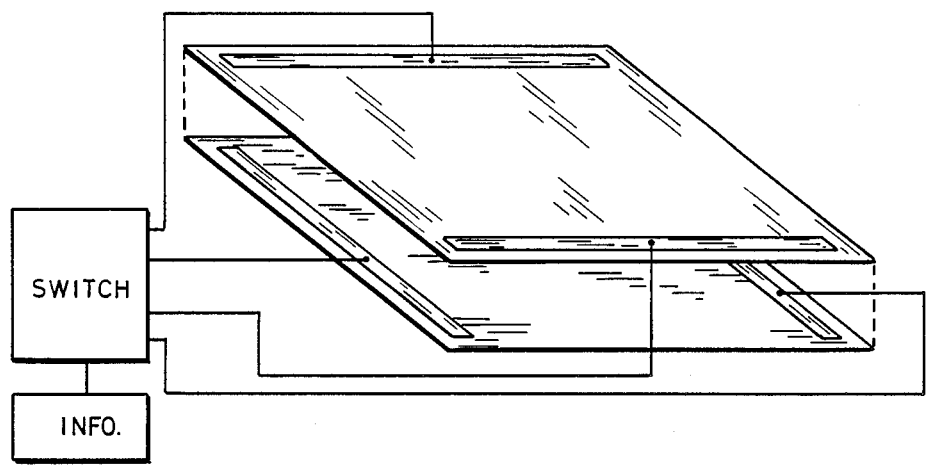
FIGS. 1A and 1B depict the essential components of two common types of touch sensor systems of the prior art for a better understanding of the present invention.
Figure 1B:
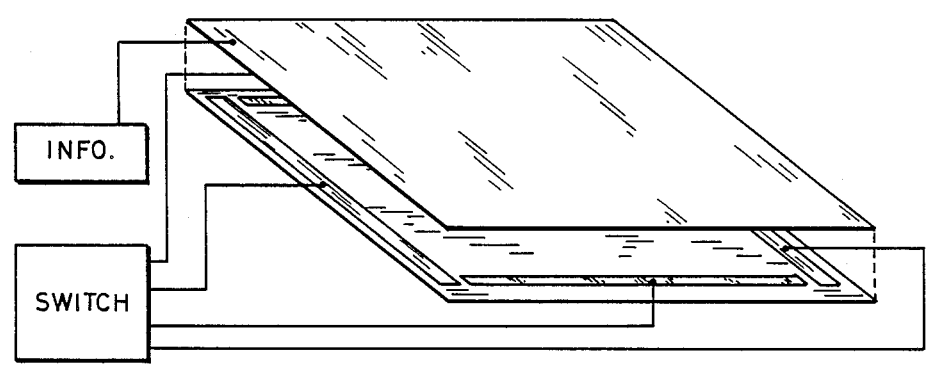

In order to have a better understanding of the present invention, two typical prior art touch sensor systems are illustrated in FIGS. 1A and 1B. For example, in FIG. 1A, the sensor has two sheets of material that have a uniform resistivity as typically produced by a layer of semiconducting material. One of the sheets has electrodes located along two opposite edges, and the other sheet has the two electrodes along opposite edges oriented orthogonally to those of the first sheet. During operation a voltage is impressed across the upper sheet for a short duration by providing this voltage from a switch means and appropriate leads. When the sheets are brought in contact by a touch at a point, the voltage at that point in the upper sheet is transferred to the lower sheet. This voltage is "read" from the lower sheet and becomes a signal representing the Y-coordinate of the touched point. The appropriate voltage is then switched to the electrodes on the lower sheet such that the voltage therein at the touched point is then transferred to the upper sheet, with this representing the X-coordinate of the touched point. This switching is carried out at a rapid rate and the information is thus displayed as the coordinates of the point.

The prior art embodiment of FIG. 1B functions somewhat differently, but also produces the information as to the coordinates of a touched point. The difference is that the voltage gradient for the X- and Y-directions is produced alternately in only the lower layer. The upper layer is only used to obtain the output signals. In this layer, and the layer of FIG. 1A that is obtaining the output signal, one edge is maintained at ground (or low) potential. Since a signal of contact resistance between the sheets due to contact pressure is dependent upon voltage, a substantial difference in pressure signal will exist between regions near the low potential electrode as contrasted to the opposite electrode. Thus, no meaningful pressure information can be obtained from either of these embodiments of the prior art because of the variation as a function of position across the signal generating sheet.

Figure 2:
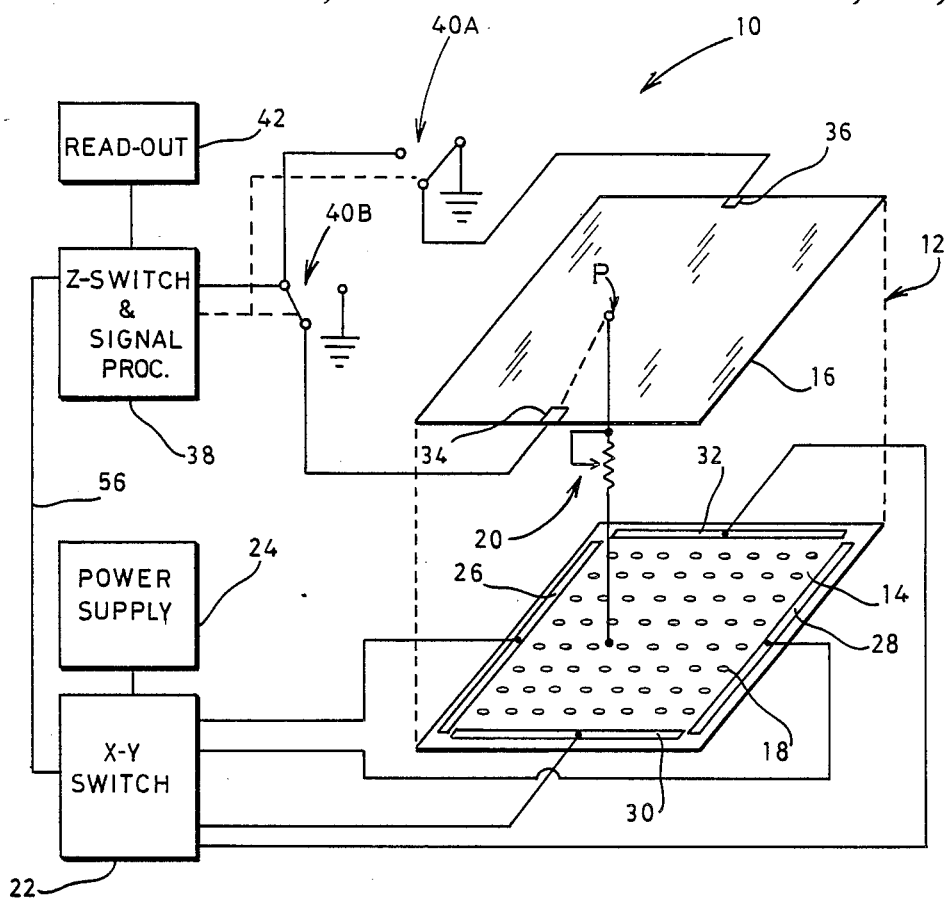
FIG. 2 is a diagrammatical representation of the relationships between the components of a device constructed in accordance with various features of the present invention.

In contrast, a device constructed in accordance with the present invention will provide meaningful pressure information without being substantially affected by position of touch on the sensor. This device is indicated generally at 10 in FIG. 2. There is a touch sensor unit 12 that can be of any conventional type; however, for easier understanding a touch sensor of the type illustrated in FIG. 1B is illustrated. This sensor has a lower layer 14 that is coated with a suitable resistive material, such as an indium-tin oxide. This lower layer is typically transparent whereby the sensor can be placed over an illuminated data source. Spaced above the lower layer 14 is the contact layer 16 that is typically coated with nickel-gold so as to be substantially conductive. This contact layer is also typically transparent. Inadvertent contact between the layers is prevented by an array of insulating dots or the like 18. When the layers are brought into intentional contact, as with pressure at a point P, a variable resistive circuit 20 is created where the resistance is a function of the pressure and the value of the resistance coatings on the layers. Any signal that can be derived is dependent upon this resistance of circuit 20 and any voltage that is impressed across the resistive circuit. As pointed out above, this voltage is highly dependent upon position in the sensors of the prior art.

In this embodiment of the present invention, the appropriate electrical fields for determining the X- and Y-coordinate signals are produced in proper time sequence in the lower layer 14 by action of a switching means depicted at 22 and the power supply means 24. For example, when a voltage is impressed between electrodes 26 and 28 (and no voltage across electrodes 30, 32), a potential gradient is created in layer 14 in the X-direction. Then, when the voltage is impressed between electrodes 30 and 32 (with none between electrodes 26, 28), a potential gradient is created in layer 14 in the Y-direction. Accordingly, when contact is made between the layers 14 and 16 by the application of pressure at point P, a voltage will be impressed upon the upper sheet 16, with that voltage being the alternating representatives of the X- and &-coordinates of point P. Since the upper layer is at least partially conductive, this "pick-up" voltage will appear at both contact electrodes 34, 36 at the edges thereof. One of these contacts on upper layer 16 (e.g., contact 36) is normally held at ground (or low potential), with the other contact (e.g., contact 34) being connected to a signal processing means 38.

However, in accordance with the present invention, periodically the roles of contacts 34 and 36 on upper layer 16 are reversed whereby contact 34 is grounded and contact 36 is connected to the signal processing means 38. The purpose, and the result, of this switching will be described in greater detail hereinafter with regard to determining the pressure applied at the point P. This switching occurs through the operation of switches 40A and 40B which are controlled by the signal processing means 38. Further, this switching is coordinated with the operation of the switch for the X- and Y-voltage application so as to be in proper timed sequence. Although the switches 40A and 40B are shown as being exterior to the signal processing means 38 and as being mechanical switches, this is only for illustration purposes and the switching can be a part of switch means 22 or a part of the signal processing means 38. Also, the switches 40A and 40B are preferably electronic devices. The signal processing means 38 provides information that is displayed and/or recorded in a readout means 42.

Figure 3:
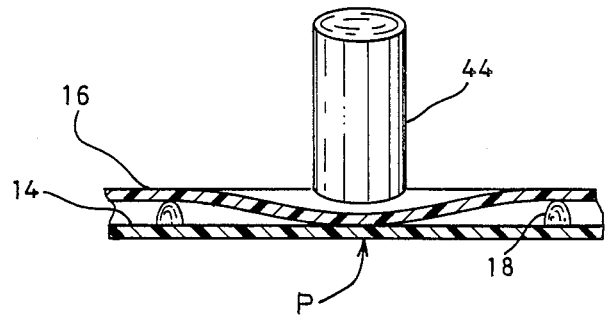
FIG. 3 is an enlargement of a portion of a touch sensor illustrating the deformation of one layer of the sensor to the second layer to produce a region of contact resistance therebetween.
Figure 4:
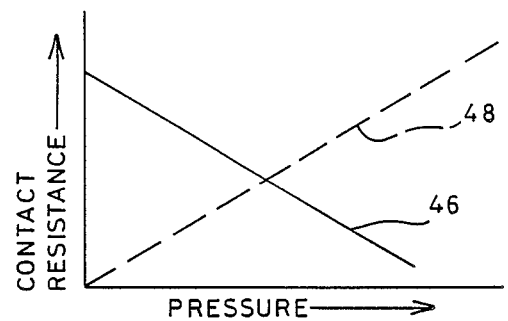
FIG. 4 is a plot of the contact resistance between the two layers of FIG. 3 at the contact point versus the applied force showing the inverse relationship of applied pressure and the resultant resistance between the layers.

To better understand the production of pressure-sensitive information by the present invention, reference is made to FIGS. 3 and 4. Referring first to FIG. 3, when an object 44, such as a finger, stylus or the like, is pressed against the sensor unit 12, the upper layer 16 is deformed against the lower layer 14 at the touched point, P, as shown. It can be seen how the insulating dots, etc., 18 maintain the separation of the other portions of the layers. Due to the resistivity of at least one of the layers, there is a contact resistance produced between the layers that varies inversely as a function of the pressure. This can be seen in FIG. 4. It is desirable that this relationship of contact resistance and pressure be linear, if possible. Thus, as the pressure increases, the contact resistance between the layers decreases following the curve designated with the numeral 46. Assuming a given potential on one of the layers at the contact point, there will be a current signal that is inversely proportional to the contact resistance and directly proportional to the pressure as illustrated by the curve designated with the numeral 48. In order to have this current signal substantially constant for a given pressure at any position on the sensor, a substantially constant voltage must exist at any position on the sensor: this cannot exist in the sensors of the prior art.

Figure 5:
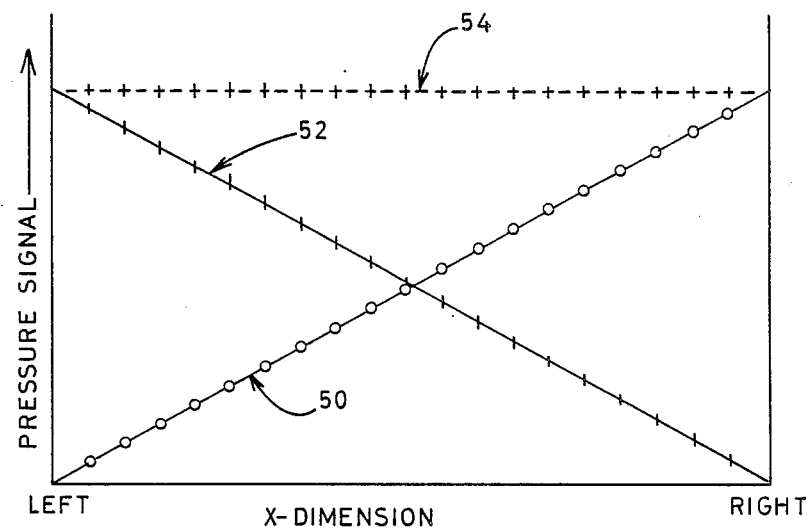
FIG. 5 is a plot of relative resistance values obtained to touches of a given pressure applied at various positions across the sensor of the present invention.

Referring now to FIG. 5, shown therein is a plot of signal strengths for a given applied pressure at different positions across the sensor surface (e.g., across the X dimension). The curve designated with the numeral 50 is that obtained when contact 34 (see FIG. 2) is grounded or at low potential. Thus, there is a significantly smaller signal for a given pressure near contact 34 than exists for the same pressure as contact 36 is approached. In a similar manner, as illustrated by the curve designated with the numeral 52, when contact 36 is switched to ground (or low potential), the pressure signal is significantly smaller when the point of applied pressure is near contact 36 as contrasted to a point near contact 34. However, if there is a rapid switching as to the grounding of contacts 34 and 36 (using the switches 40A and 40B of FIG. 2), there will be an effectively constant voltage on the sheet in the complete region between the contacts 34 and 36. When this occurs, in accordance with the present invention, a given pressure will produce a substantially constant signal completely across the sensor as illustrated by the curve designated with the numeral 54. These curves 50, 52 and 54 are idealized curves; however, actual curves obtained with the present invention approximate those illustrated in this FIG. 5. The value of the pressure signal depicted in FIG. 5 is arbitrary and depends upon the voltage derived by the layer having contacts 34 and 36, with this value actually produced in the second layer of the sensor. Thus, in order to obtain meaningful pressure measurement signals, the layer used to obtain the signals must see the same potential for each touch at any position on the touch sensor. This is accomplished by applying the same voltage to the electrodes on one set to the opposite electrodes in the second layer during the production of the pressure signal. Thus, the timing of the operation of the switches 40A and 40B must be coordinated with the switching of the voltages applied to the electrodes on the layers of the sensor. This coordination is indicated with line 56 in FIG. 2.

The device of the present invention can be utilized to just produce a signal that is proportional to the pressure, or this signal can be converted in the readout means into a specific value of pressure, such as pounds per square inch, etc. Alternately, a threshold value can be established such that when a given pressure is exceeded, some action can or will be taken by equipment associated with the sensor.

In summary, at one time interval in the operation of the sensor there is a fixed voltage applied to electrodes on opposite edges of one of the sensor layers or sheets so as to produce a uniform potential throughout that sheet. During this same time interval, the contacts (or electrodes) on a pair of opposite edges of the second layer or sheet are rapidly switched so as to alternately be connected first to ground (or low potential) and then to the signal processing means. In this way, a substantially uniform potential will be impressed in the second layer at any touched point (for a given pressure) so that a signal substantially proportional to the applied pressure will be produced.

From the foregoing detailed description, it can be seen that a device is provided that is capable of obtaining practical information as to the pressure applied to the device. This information is obtained in addition to information as to the X- and Y-coordinates of the point on the sensor that is contacted. Further, this feature is provided without the manufacture of a special sensor; rather, the feature comes about by the circuitry associated with the sensor. Thus, sensors designed only for X- and Y-coordinate information can be utilized with the appropriate circuitry to achieve X, Y and Z information.

Although only specific embodiments of the invention have been shown and described, this is not to be construed as a limitation of the invention. Rather, the invention is to be limited only by the appended claims and their equivalents when read together with the complete description of the invention.

I claim:

1. In a touch sensor device for providing information as to the coordinates of a selected point touched on said sensor together with information as to the pressure applied at said touched point, said sensor having first and second sensor sheets each having a selected uniform sheet resistance value, said first sensor sheet provided with contacts on a pair of opposite edges for deriving analog signals related to said touched point, one of said contacts for being connected to signal measuring means and the second of said contacts for being connected to a fixed low potential, said sensor further having a source of voltage and a first switch means for connecting said source of voltage to said sensor sheets in a time sequence wherein orthogonal potentials are created within said sensor whereby said signal measuring means receives said analog signals related to said coordinates of said touched point, the improvement comprising a second switch means coordinated with said first switch means for alternating the connections of said contacts on said first sensor sheet between said signal measuring means and said low fixed potential, said second switch means further causing said signal measuring means to monitor contact resistance between said sensor sheets at said touched point during selected time intervals between monitoring said analog signals of said coordinates of said touched point to thereby obtain said information as to said pressure applied at said touched point substantially independent of the position of said touched point on said sensor.

2. The touch sensor of claim 1 wherein said second sensor sheet is provided with contacts on a pair of opposite edges oriented orthogonally with respect to said contacts on said first sensor sheet, and said first switch means alternately connects said source of voltage to said contacts of said first and second sensor sheets to create said orthogonal potentials in said sensor.

3. The sensor of claim 1 wherein said second sensor sheet is provided with contacts along each edge, and said first switch means alternately connects said source of voltage to a first opposite pair of said contacts on said second sensor sheet and to a second opposite pair of said contacts on said second sensor sheet to create said orthogonal potentials in said second sensor sheet of said sensor.

4. The touch sensor of claim 1 wherein said first and second sensor sheets are substantially transparent.

5. The touch sensor of claim 1 wherein said first sensor sheet is separated from said second sensor sheet by a plurality of spaced apart insulating dots to prevent inadvertent contact between said first and second sensor sheets but permit intentional contact therebetween.

6. A touch sensor device for providing information as to the coordinates on a selected point on said sensor together with information as to the pressure applied at said touched point, which comprises:

first and second sensor sheets, each having a selected uniform resistance value, said first sensor sheet provided with contacts on a pair of opposite edges for deriving analog signals related to said touched point, one of said contacts for being connected to signal measuring means and the second of said contacts for being connected to a fixed low potential;

a source of voltage;

a first switch means for connecting said source of voltage to said sensor sheets in a timed sequence wherein orthogonal potentials are created within said sensor whereby said signal measuring means receives said analog signals related to said coordinates of said touched point; and a second switch means coordinated with said first switch means for alternating the connections of said contacts on said first sensor sheet between said signal measuring means and said fixed low potential, said second switch means further causing said signal measuring means to monitor contact resistance between said sensor sheets at said touched point during selected time intervals between monitoring said analog signals of said coordinates of said touched point to thereby obtain said information as to said pressure applied at said touched point, said information as to said pressure being substantially independent of the position of said touched point on said sensor.

7. The touch sensor of claim 6 wherein said second sensor sheet is provided with contacts on a pair of opposite edges oriented orthogonally with respect to said contacts on said first sensor sheet, and said first switch means alternately connects said source of voltage to said contacts of said first and second sensor sheets to create said orthogonal potentials in said sensor.

8. The sensor of claim 6 wherein said second sensor sheet is provided with contacts along each edge, and said first switch means alternately connects said source of voltage to a first opposite pair of said contacts on said second sensor sheet and to a second opposite pair of said contacts on said second sensor sheet to create said orthogonal potentials in said second sensor sheet of said sensor.

9. The touch sensor of claim 6 wherein said first and second sensor sheets are substantially transparent.

10. The touch sensor of claim 6 wherein said first sensor sheet is separated from said second sensor sheet by a plurality of spaced apart insulating dots to prevent inadvertent contact between said first and second sensor sheets but permit intentional contact therebetween.

11. A touch sensor device for providing information as to the coordinates of a selected point touched on said sensor, together with information as to the pressure applied at said touched point, which comprises:

a first sensor sheet having a first surface against which pressure can be applied at said selected point with an object, said first sensor sheet having a coating of at least partially conductive material on a second surface opposite said first surface;

a second sensor sheet having a coating of at least partially conductive material on a surface facing said second surface of said first sensor sheet;

a first pair of electrodes attached to opposite edges of said first sensor sheet in contact with said coating on said first sensor sheet;

at least one second pair of electrodes attached to opposite edges of said second sensor sheet in contact with said coating on said second sensor sheet, and oriented orthogonally to said first pair of electrodes on said first sensor sheet;

a source of voltage;

switch means for connecting said source of voltage to selected of said electrodes on said first and second sensor sheets to alternately produce orthogonal electrical fields within said sensor during a first time interval whereby first analog signals are generated at one of said electrodes of said first pair of electrodes, said first analog signals corresponding to coordinates of the point of applied pressure;

further switch means coordinated with said first switching means for connecting said source of voltage to both electrodes of said second pair of electrodes during a second time interval alternating with said first time interval, and for alternating connecting electrodes of said first pair of electrodes between said low potential and said analog signal production condition during said second time interval to generate an analog signal corresponding to pressure applied at said point; and information processing means connected to said further switch pair during said first time interval to produce digital signals corresponding to said coordinates of said point, and to receive information from said electrodes of said first pair during said second time interval to produce digital signals corresponding to said pressure applied at said point.

12. The touch sensor of claim 11 wherein said first switch means alternately connects said source of voltage to said first pair of electrodes of said first sensor sheet and then to said second pair of electrodes of said second sensor sheet whereby voltage gradients are alternately produced in said first and second sensor sheets that are orthogonal so as to produce said analog signals corresponding to coordinates of a touched point.

13. The touch sensor of claim 11 wherein said second sensor sheet is provided with a further second set of electrodes along edges that are orthogonal to said second pair of electrodes, and wherein said first switch means connects said source of voltage to said electrodes of said second sensor sheet to produce alternating orthogonal potential gradients in said second sensor sheet.

14. The touch sensor of claim 11 wherein said first and second sheets are substantially transparent.

15. The touch sensor of claim 12 wherein said first sensor sheet is separated from said second sensor sheet by a plurality of spaced apart insulating dots to prevent inadvertent contact between coatings on said first and second sensor sheets but permit intentional contact therebetween.

* * * * *